United States Patent
Chrisop et al.

(10) Patent No.: US 6,646,658 B1
(45) Date of Patent: Nov. 11, 2003

(54) TAGGING DATA FILES WITH APPLICATION INFORMATION

(75) Inventors: Roy Kenneth Chrisop, Camas, WA (US); Larry Alan Westerman, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/574,674

(22) Filed: May 17, 2000

(51) Int. Cl.$^7$ .............................. G09G 5/00; G06F 17/00
(52) U.S. Cl. ..................... 345/749; 345/733; 715/511
(58) Field of Search ................................ 345/733, 744, 345/749, 760; 707/203; 715/516, 511, 513

(56) References Cited

U.S. PATENT DOCUMENTS

| | | | |
|---|---|---|---|
| 5,652,876 A | * | 7/1997 | Ashe et al. |
| 5,761,499 A | | 6/1998 | Sonderegger |
| 5,835,914 A | | 11/1998 | Brim |
| 5,838,906 A | | 11/1998 | Doyle et al. |
| 5,890,172 A | | 3/1999 | Borman et al. |
| 5,893,122 A | | 4/1999 | Tabuchi |
| 5,905,991 A | | 5/1999 | Reynolds |
| 5,909,684 A | | 6/1999 | Nelson |
| 5,913,210 A | | 6/1999 | Call |
| 6,122,649 A | * | 9/2000 | Kanerva et al. |
| 6,256,668 B1 | * | 7/2001 | Slivka et al. |
| 6,347,398 B1 | * | 2/2002 | Parthasarathy et al. |

FOREIGN PATENT DOCUMENTS

| | | |
|---|---|---|
| JP | 01-166274 | 6/1989 |
| JP | 04-347733 | 12/1992 |

OTHER PUBLICATIONS

Inside Macintosh—Macintosh Toolbox Essentials. Apple Computer Inc. 1992. Chapter 7.*

* cited by examiner

Primary Examiner—John Cabeca
Assistant Examiner—Brian Detwiler
(74) Attorney, Agent, or Firm—Marger Johnson & McCollom, PC

(57) ABSTRACT

A method and structure for tagging data files with application information. A control application is distributed to users and recipients of data files. The control application allows users to either create or open a data file. To create a data file, the control application accesses the desired creating application and embeds information about the control application into the data file. The control application also includes information on a location of the exact version of the exact application for access of the contents of the data file. To open a data file, the control application accesses the embedded information and determines if the proper version of the correct application is present. If it is not, the control application uses the location information to access the proper version of the application, download it to a local site, and use it to access the contents of the data file.

12 Claims, 3 Drawing Sheets

TAGGING DATA FILES WITH APPLICATION INFORMATION

BACKGROUND OF THE INVENTION

1. Field of the Invention

This invention relates to data files created using computing applications, more particularly to a file format for use with distributed computing applications.

2. Background of the Invention

Many specific computer tasks may be performed using different software applications. For example, creating a text document may be done on a personal computer (PC) using Wordpad or Word, products of Microsoft Corporation, or Pagemaker a product of Adobe Corporation, as well as many others. Several users may want to share a document, yet not all the users may have the same applications available to them and therefore cannot access the document to be shared.

One solution to this problem is common interchange formats, such as metafiles or rich text files that can be imported to other applications. Similarly, several word processing applications provide the ability to open a file under the File menu as "Open As . . . " where the user can identify the format and the application can then recognize the format and convert it to the application format.

However, neither of these approaches are problem free. In some instances, even if the application recognizes the document format it cannot access the document. In others, some formatting or special features are lost upon conversion. Additionally, the conversion process places an additional burden on the creator of the document, who must take into account the applications available to the other uses.

Some operating systems such as Macintosh® and Windows(& have association tables that identify the application to be used to open a particular document. In the Macintosh® operating system a file is tagged with a token and the table associates the tokens with the applications. In the Windows® operating system the association table correlates the file extension to applications. Unfortunately, neither of these solve a problem that arises with different versions of an application.

For example, the creating user uses an application version 4.0 that has added feature that were not available in version 3.0. Another user wants to view the document, but the file association table for that user opens the document with version 3.0. The viewing user can no longer view anything in the document that needs the added features of version 4.0.

These problems will become more prevalent with the advent of application service providers (ASPs). An application service provider provides subscribers with access to applications such as word processing, multimedia presentation software, accounting and spreadsheet software, etc., across some connection. Subscribers can then use the applications to create documents without having to have the entire application loaded on their PC. This will allow subscribers to have access to a wider number of applications that they may not otherwise have purchased or cannot afford. The higher number of available applications for creating documents will increase the likelihood that other users may not have the correct application on their PC to view the document.

Current solutions to these problems fall into two general categories, embedding applications into the files or embedding information about the applications into the files. The first approach can be seen by U.S. Pat. Nos. 5,835,914, issued Nov. 10, 1998; 5,838,906, issued Nov. 17, 1998; 5,890,172, issued Mar. 30, 1999; or 5,909,684, issued Jun. 1, 1999. The second approach can be seen in U.S. Pat. Nos. 5,761,499, issued Jun. 2, 1998; 5,893,122, issued Apr. 6, 1999; 5,905,991, issued May 18, 1999; or 5,913,210, issued Jun. 15, 1999. However, none of these solutions allow users to not only identify the creating applications, but allow the user to download the application as needed for accessing the file.

Therefore, a need exists for a method of identifying the application used to create a document to allow other users to access the document with the correct application.

SUMMARY OF THE INVENTION

One aspect of the invention is a method for creating and opening data files with embedded association information. The method operates within a control application. The control application could be one application with different capabilities dependent upon the characteristics of the user. The control application offers the option of creating or opening a data file. To create a data file, the control application allows the user to select one creating application from a number available on an application server. After the data file is created, the control application embeds association information about the creating application into the data file, including the version of the creating application and a location from where that application can be accessed. To open a data file, the control application examines the association information and determines if the creating application is available. If it is not, the control application uses the location information to access the proper version of the correct application, initializes it and allows it to open the contents of the data file.

BRIEF DESCRIPTION OF THE DRAWINGS

The invention may be best understood by reading the detailed description with reference to the drawing(s), wherein.

DETAILED DESCRIPTION OF THE PREFERRED EMBODIMENTS

As the ease of using the Internet increases, along with faster network connections, more services will be provided to users. Such services include providing applications to the users in a central location through application service providers (ASPs). An ASP allows users to have access to applications for which they cannot afford to pay full price, or have no desire to use up the memory required to load it onto their individual personal computers.

With the availability of far more applications, and far more versions of applications, the possibility of incompatible applications being used by different users increases. Several users that want to share a document may all have access to different applications for word processing. These applications may create a document that is not importable to some or all of the other applications.

The term document as used here is merely for illustrative purposes. Users may desire to share other types of files, not necessarily documents. For that reason, the created object will be referred to as a data file. The created object may be a word processing document, a multimedia presentation, a spreadsheet, possibly even a sound or video file. The exact nature of the data file is only limited by the applications available to the user in creating it.

The user could access applications by means other than application service providers. A centralized depository of applications could be available, such as on a work group server. The user could access applications across the network, create data files and share them with others. In this example, users within the same group would all have access to the same applications and versions of applications. If the sharing group included people outside of the work group, however, the same problems would occur.

Figure 1:
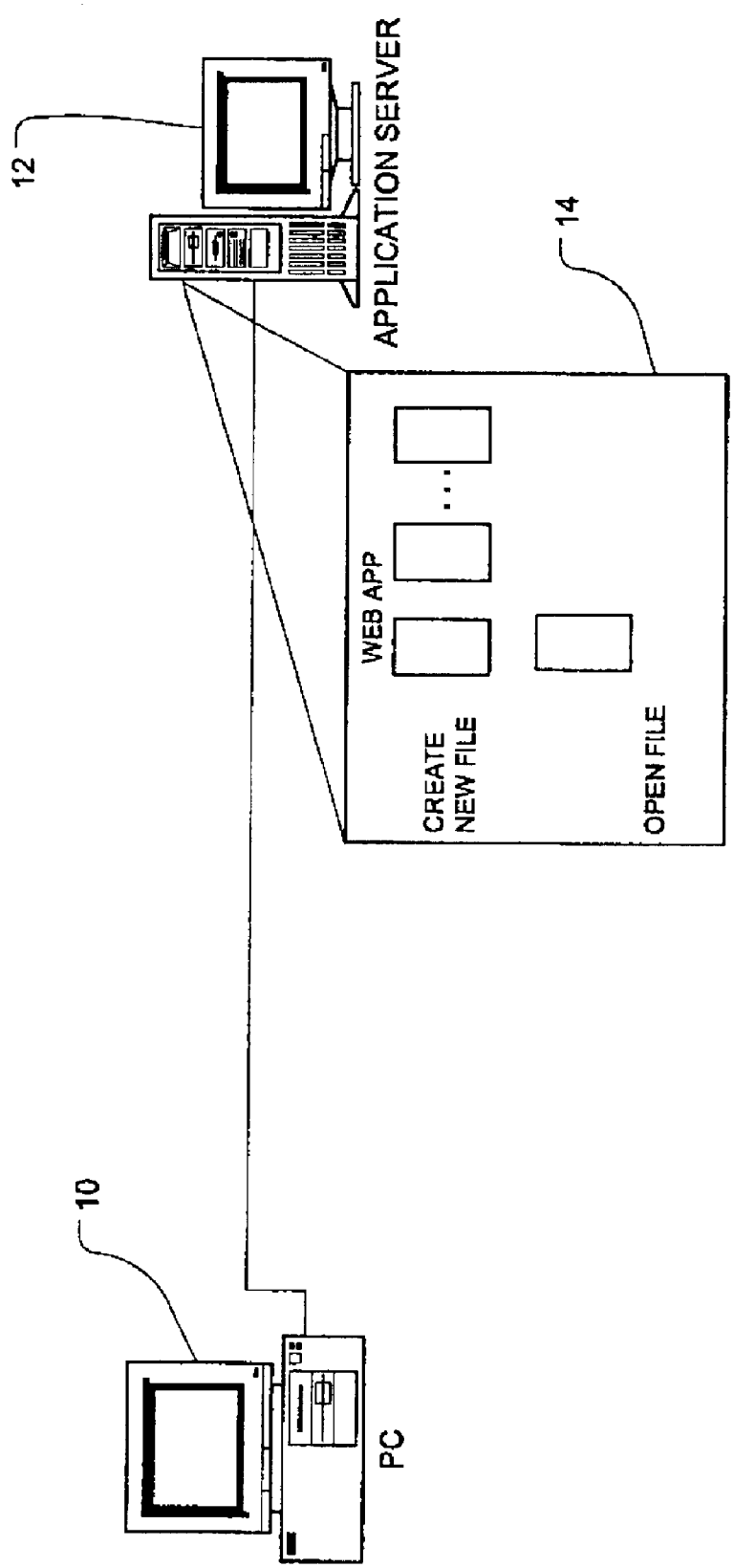
FIG. 1 shows a user interface for an application control document in accordance with the invention.

FIG. 1 shows a situation where there is a user personal computer or workstation 10 and an application server 12. The application server 12 could be from an application service provider, a work group or one of several other examples. Similarly, the network connection between the two could be a local or wide area network, the Internet, or any other type of network.

The application server 12 presents the user with a user interface 14. The user interface provides the user with options to create a data file or to open a data file. Each of these processes will be discussed with reference to FIG. 3. Creation of a data file will be provided to users who are subscribers or members of the group with access to the applications available. The icons next to the create option would be for those applications.

Opening a data file is an option that may be available to users other than those who have access to the applications for creation. As will be discussed in more detail with reference to FIG. 3, opening a data file may be performed by someone who has received a data file that points that person to the application server upon which the data file was created.

Figure 2:
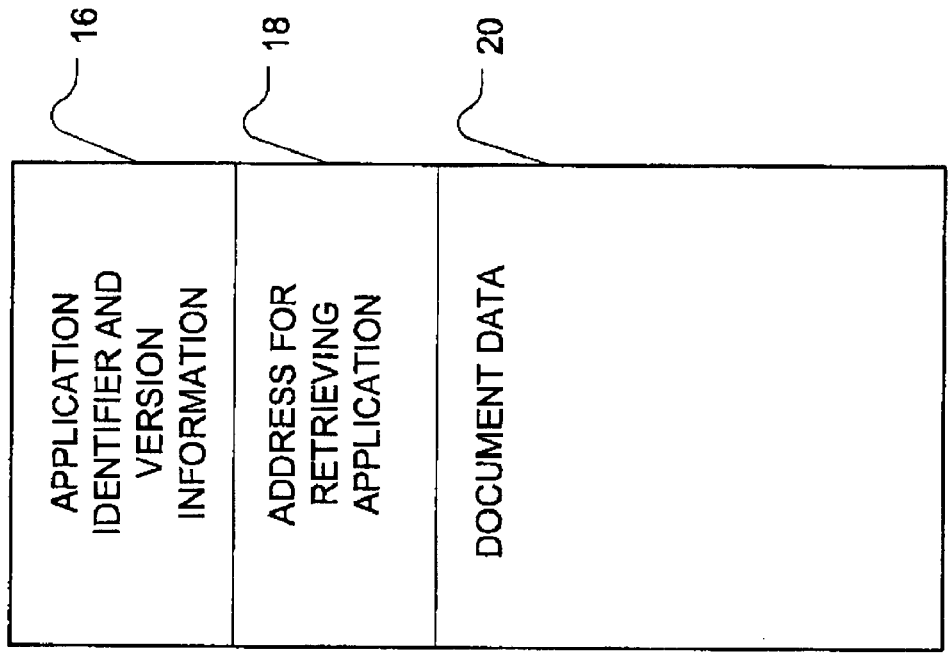
FIG. 2 shows a file format containing application information in accordance with the invention.

The format of the data file that allows this pointing to occur is shown in FIG. 2. Association information would be embedded into the data file. The association information would include a section 16 of the data file that identifies not only the creating application, but the version of the application as well. This is similar to the association tables used by Macintosh® and Windows® file management systems. However, unlike those tables, which are maintained by the operating system external to the file, this association is embedded directly into the file itself.

In addition to the section referring to the application and the version, a second section 18 of the association information would contain reference information. The reference information would point a control application, discussed in FIG. 3, to the location of a copy of the proper version of the necessary application. This location could be a network address, such as a shared drive for a workgroup or a uniform resource locator (URL) of a web address. The reference information may include other information necessary to access and initialize the application necessary to open the file for that application. This may include a confirmatory dialogue with the user.

The control application would be distributed by several means. It would be available through some storage medium, such as a downloadable file, an e-mail attachment, or physical means such as a computer-readable diskette or compact disc read-only-memory. When accessed by a computing device, such as the personal computer of FIG. 1, among others, the storage medium would contain the software code for the control application. In addition to the distribution options mentioned above, the control application could be embedded as executable code inside the association information of the data file as the storage medium, and executed upon access of the data file. In this case, the control application would be embedded in such a manner that it would launch upon access of the file and would then separate itself from the data file in order to analyze the association information.

The operation of this software would result in presentation of the user interface to allowing the user to select a data file to be opened. It would then allow examination of the association information of the data file, determination of the existence of the necessary application and proper version for the data file and retrieval of the application as necessary.

Figure 3:
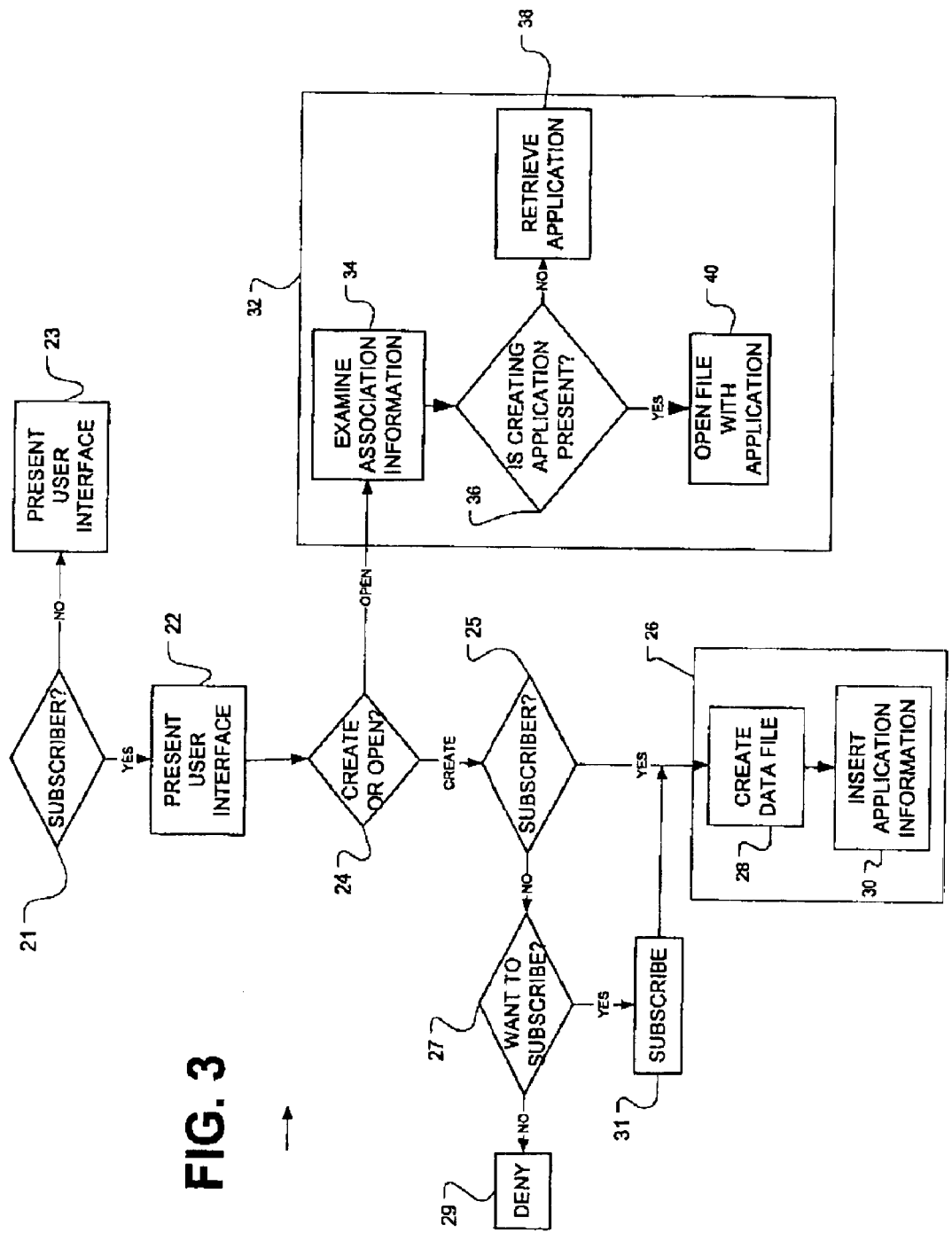
FIG. 3 shows a method for application control in accordance with the invention.

The control application would operate in the method set out in FIG. 3. A single control application could perform the functions contained in the boxes 26 and 32, as will be discussed further. When a user accesses the application server as a subscriber, the control application would offer both options to the subscriber. When a recipient of the data file created by a subscriber is not a subscriber the control application may be restricted to only offer the functions shown in box 32. The process may determine who is a subscriber at 21.

The term subscriber as used here includes both those users that subscribe to an application service provider of some kind and users that are part of a workgroup using a common repository of applications. It may be advantageous for an ASP to allow both functions to be available to all recipients, subscribers or not. When non-subscribers attempt to create a new data file at 24, or even open a document, they could be offered the option of becoming a subscriber. The determination of subscriber status may be made at 25. with the option of subscription offered to non-subscribers at 27. Recipients who subscribe at 31 will be allowed to create documents. while those who do not subscribe will be denied at 29.

Alternatively, two different versions of the control application distributed as discussed above may exist. Subscribers may use one version and another version may be distributed to the recipients of the data file, by one of the methods mentioned above among others.

However distributed and controlled, the operation of the control application or applications follows a process similar to the process shown as an example in FIG. 3. For subscribers the process presents a user interface is presented at 22. The user selects to either create a document or open an existing document at 24. The selection of these options results in different paths.

If the user desires to create a data file, the file is created by the user working with the selected application at 28, assuming that the user has subscribed. either previously or through the process at 31. At the conclusion of the creation process, when the user exits the application the association information is inserted at 30. At that point the creation process 26 ends.

If the user desires to open a document, the process follows the functions in the opening process 32. The control application analyses the association information contained in the data file at 34. It then determines if the proper application and version is available in that directory or on that personal computer/workstation. If the proper application or version is not available, the control application then locates the correct application or version and updates the local directory or workstation. This may involve some further interaction with the user. Once the proper application and version is available, the data file is opened by that application.

The control application could act adjunct to a web browser, where the web browser accesses both Internet and internal application servers. The user would be able to access the application server and the control application would be a Java applet that runs upon the user accessing a web page. The control application could be one of several other options and this is intended only as an example.

Thus, although there has been described to this point a particular embodiment for a method and structure for tagging data files with application information, it is not intended that such specific references be considered as limitations upon the scope of this invention except in-so-far as set forth in the following claims.

What is claimed is:

1. A method of associating data files with a creating application, the method comprising:

presenting a user interface via a control application, wherein the user interface is operable to allow a user to select a creating application;

determining if a user is a subscriber to an application service provider;

if the user is a subscriber, receiving user input at the user interface to select the creating application;

creating a data file with the creating application;

inserting information about the creating application in a predetermined format into the data file such that the information is accessible by access of the document, wherein the information includes an application version and a location from where the application can be accessed.

2. The method of claim 1 wherein the user interface is presented across the Internet.

3. The method of claim 1 wherein the user interface is presented across a workgroup network.

4. The method of claim 1 wherein the information inserted includes executable code for a control application.

5. The method of claim 1, wherein the method further comprises:

offering the user a subscription to the application service provider, if the user is not already a subscriber;

allowing the user to subscribe, prior to creating the data file.

6. A method of identifying a creating application for a data file, the method comprising:

determining if a user is a subscriber to an application service provider;

offering a subscription to the user if the user is not a subscriber;

if the user is a subscriber, presenting a user interface via a control application, wherein the user interface allows a user to select a data file to be opened;

receiving user input at the user interface to select the data file to be opened;

examining information in the data file to identify a creating application;

determining if the creating application is available on the user's computer;

downloading the creating application, if it is not available; and opening the data file with the creating application.

7. The method of claim 6 wherein retrieving the creating application further comprises accessing an application server provided by the application service provider across the Internet.

8. The method of claim 6, wherein retrieving the creating application further comprises accessing an application server across a workgroup network wherein the application service provider is the workgroup.

9. An article comprising: a storage medium, said storage medium having stored thereon instructions, that, when executed by a computing device, result in:

determination of whether a user is a subscriber to an application service provider;

if the user is a subscriber, presentation of a user interface via a control application, wherein the user interface is operable to allow a user to select a data file to be opened;

receipt of user input at the user interface to select the data file to be opened;

examination of information in the data file to identify a creating application;

determination of the availability of the creating application; and downloading the creating application, if it is not available.

10. The article of claim 9 wherein the storage medium comprises a file stored on an application server provided by an application service provider.

11. The article of claim 9, wherein the storage medium comprises a file stored on an application server provided by a workgroup acting as the application service provider.

12. The article of claim 9, wherein the instructions, when executed, further result in offering the user a subscription, if the user is not a subscriber.

* * * * *

UNITED STATES PATENT AND TRADEMARK OFFICE
CERTIFICATE OF CORRECTION

PATENT NO.   : 6,646,658 B1
DATED        : November 11, 2003
INVENTOR(S)  : Chrisop et al.

It is certified that error appears in the above-identified patent and that said Letters Patent is hereby corrected as shown below:

Column 1,
Line 36, "Windows(& have" should read -- Windows® have --.

Column 4,
Line 33, "at 25. with" should read -- at 25, with --.
Line 36, "documents. while" should read -- documents, while --.
Line 46, "subscribers the" should read -- subscribers, the --.
Line 52, "subscribed. either" should read -- subscribed, either --.

Column 6,
Line 19, "claim 6, wherein" should read -- claim 6 wherein --.

Signed and Sealed this

Thirty-first Day of August, 2004

JON W. DUDAS
*Director of the United States Patent and Trademark Office*